US008694967B2

(12) United States Patent
Grieves et al.

(10) Patent No.: US 8,694,967 B2
(45) Date of Patent: Apr. 8, 2014

(54) USER INTERFACE INVENTORY

(75) Inventors: Jason Anthony Grieves, Redmond, WA (US); Brett D. Humphrey, Seattle, WA (US); Donald Gary Funk, Seattle, WA (US); Vidhya Sriram, Redmond, WA (US); Glenn Edgar Murphy, III, Seattle, WA (US); Paul J. Reid, Woodinville, WA (US); Dmitri Klementiev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/813,530

(22) Filed: Jun. 11, 2010

(65) Prior Publication Data

US 2011/0307865 A1 Dec. 15, 2011

(51) Int. Cl.
*G06F 9/44* (2006.01)
(52) U.S. Cl.
USPC .......................... 717/124; 717/125; 717/126
(58) Field of Classification Search
USPC ................................................ 717/124–126
See application file for complete search history.

(56) References Cited

U.S. PATENT DOCUMENTS

| | | | | |
|---|---|---|---|---|
| 5,475,843 A * | 12/1995 | Halviatti et al. | ............... | 717/124 |
| 6,146,027 A * | 11/2000 | Orton et al. | ..................... | 715/835 |
| 6,633,903 B1 * | 10/2003 | Gould | ............................ | 709/205 |
| 7,395,456 B2 | 7/2008 | Klementiev et al. | | |
| 7,421,683 B2 * | 9/2008 | Robertson et al. | ............ | 717/130 |
| 7,559,053 B2 * | 7/2009 | Krassovsky et al. | .......... | 717/126 |
| 8,201,150 B2 * | 6/2012 | Ghiloni et al. | ................. | 717/125 |
| 8,280,972 B2 * | 10/2012 | Van Belle et al. | ............. | 709/206 |
| 8,387,015 B2 * | 2/2013 | Christensen et al. | ......... | 717/124 |
| 8,429,613 B2 * | 4/2013 | Rosen | ............................ | 717/124 |
| 2005/0071324 A1 * | 3/2005 | Bitsch et al. | ....................... | 707/3 |
| 2005/0132333 A1 * | 6/2005 | Neumann et al. | ............. | 717/124 |
| 2006/0129988 A1 * | 6/2006 | Calsyn et al. | .................. | 717/124 |
| 2006/0184410 A1 | 8/2006 | Ramamurthy et al. | | |
| 2006/0184866 A1 * | 8/2006 | Rees | ............................. | 715/500 |
| 2008/0127103 A1 * | 5/2008 | Bak | ................................ | 717/126 |
| 2008/0148235 A1 * | 6/2008 | Foresti et al. | ................... | 717/123 |
| 2008/0235633 A1 * | 9/2008 | Ghiloni et al. | ................. | 715/862 |
| 2009/0044110 A1 * | 2/2009 | McLean | ........................ | 715/704 |

(Continued)

OTHER PUBLICATIONS

Ivory et al., "The state of the art in automating usability evaluation of user interfaces," ACM Computing Surveys (CSUR) vol. 33, Issue 4, Dec. 2001, pp. 470-516.*

(Continued)

*Primary Examiner* — Thuy Dao
*Assistant Examiner* — Stephen Berman
(74) *Attorney, Agent, or Firm* — Carole Boelitz; Micky Minhas (57) ABSTRACT

User interface elements are identified and cataloged into a user interface inventory database keyed on a global user interface element identifier. Information is collected for user interface elements activated in an executing application or applications. Scenario information is collected and is used to update the user interface inventory database. Scenario information includes information concerning user interface element usage, state changes, etc. in time. The described information can be collected over a period of time and from a number of different computer systems. The information can be analyzed to determine and quantify usage and testing of user interface elements. The analyzed information can be used to determine how thoroughly a user interface element has been tested, how often the user interface element works as expected, most commonly used user interface elements and other information. The collected information can be used to track, quantify and identify ownership of user interface elements.

15 Claims, 4 Drawing Sheets

(56) References Cited

U.S. PATENT DOCUMENTS

| | | | |
|---|---|---|---|
| 2009/0070455 A1* | 3/2009 | Cervantes | 709/224 |
| 2009/0106764 A1 | 4/2009 | Klementiev et al. | |
| 2009/0217302 A1 | 8/2009 | Grechanik et al. | |
| 2010/0064282 A1* | 3/2010 | Triou et al. | 717/125 |
| 2010/0082733 A1 | 4/2010 | Bernstein et al. | |
| 2011/0173589 A1* | 7/2011 | Guttman et al. | 717/125 |

OTHER PUBLICATIONS

Steven et al., "jRapture: A Capture/Replay tool for observation-based testing," 2000, ISSTA '00 Proceedings of the 2000 ACM SIGSOFT international symposium on Software testing and analysis, pp. 158-167.*

Hilbert et al., "Extracting usability information from user interface events," ACM Computing Surveys (CSUR) Surveys Homepage archive, vol. 32, Issue 4, Dec. 2000, pp. 384-421.*

Tan, et al., "Developing an Enabled Adaptive Architecture to Enhance Internet accessibility for visually impaired people", Retrieved at << http://www.icdvrat.rdg.ac.uk/2006/papers/ICDVRAT2006_S07_N02_Tan_et_al.pdf >>, International Conference Series on Disability, Virtual Reality and Associated Technologies (ICDVRAT), 2006, pp. 231-238.

Eustice, et al., "A Universal Information Appliance", Retrieved at << http://www.inf.ufsc.br/~rcampiol/pervasive_computing/Artigos/IBM/A%20universal%20information%20appliance.pdf >>, IBM Systems Journal, vol. 38, No. 4, Dec. 1999, pp. 575-601.

Harris, Kip., "Challenges and Solutions for Screen Reader / I.T. Interoperability", Retrieved at << http://www.sigaccess.org/community/newsletter/june_2006/jun06_02.pdf >>, ACM SIGACCESS Accessibility and Computing, No. 85, Jun. 2006, pp. 10-20.

Harrington, Paul., "WPF in Visual Studio 2010—Part 6: Automated UI Testing", Retrieved at << http://blogs.msdn.com/visualstudio/archive/2010/03/30/wpf-in-visual-studio-2010-part-6-automated-ui-testing.aspx >>, Retrieved Date: Apr. 19, 2010, pp. 5.

* cited by examiner

USER INTERFACE INVENTORY

BACKGROUND

Software testing can be viewed as the process of validating and verifying that a software program, application or product meets its business and technical requirements, executes as expected and can be implemented. Different software development models focus the test effort at different points in the development process.

Software can be tested using a number of different methods including code coverage, manual and automated testing, and scenario and feature testing. User interfaces are particularly problematic to test. Testing user interfaces is particularly difficult because of the potential range of use of each user interface element and because of the necessity of dealing with sequences. Even a small program such as Microsoft® Word-Pad has at least 325 possible user interface operations. In a large program, the number of operations to be tested can easily become unwieldy.

Another problem associated with testing user interfaces involves sequencing. Certain functionalities of the system may only be invoked by initiating a complex sequence of user interface events. For example, to open a file in Microsoft® Word, a user may have to click on the File Menu, select the Open operation, use a dialog box to specify the file name, and then focus the application on the newly opened window. Clearly, increasing the number of possible operations increases the sequencing problem exponentially. In addition, rich user interfaces can be re-arranged into a variety of views or modes further complicating the testing matrix.

SUMMARY

User interfaces can be cataloged into a user interface inventory database, enabling the collection, cataloging, testing, and reporting on the user interfaces contained in a target codebase. By using a global identifier for each user interface element and associating the user interface element with metadata, the number of user interface elements for which a developer or group of developers is responsible can be determined. The number of user interface elements can be quantified, tracked and reported on. The degree of testing performed on a user interface element or group of user interface elements can be determined and quantified. The global identifier for each user interface element can be consistent across platforms, SKU's, architectures, milestones, and languages so that information from many different computers or computer systems can be added to the user interface inventory database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Traditional testing methods leave a gap in the ability to test user interfaces across complex software such as but not limited to operating systems. When software can include thousands of user interfaces stretching across multiple architectures, languages, SKUs, platforms, and milestones, there is no known way to quantify the number of user interfaces that have been tested or even how many user interfaces exist in the system. The subject matter described herein is directed to producing quantifiable results so that testing of computer program code can be tracked and owners can be made accountable for the software they create.

User Interface Inventory

Figure 1:
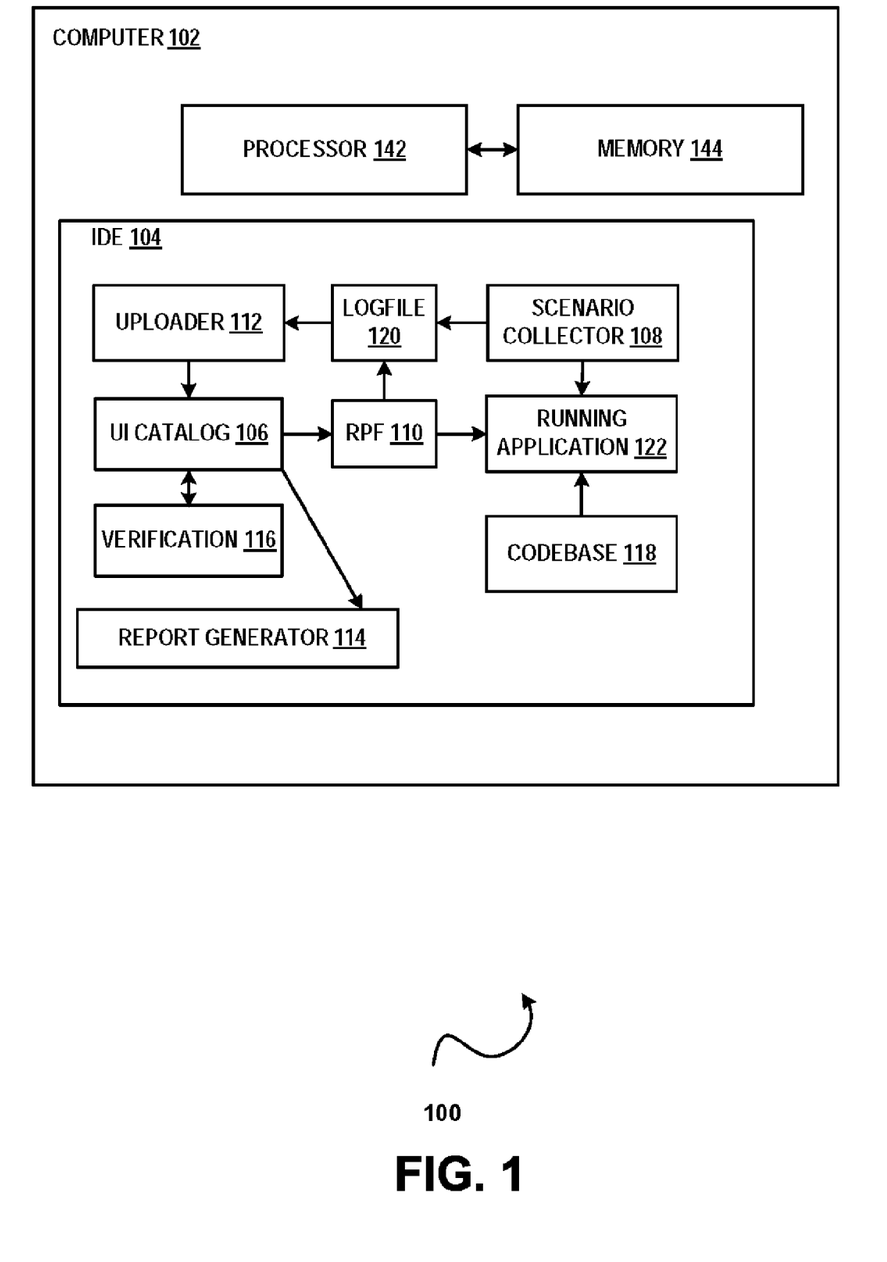
FIG. 1 illustrates an example of a user interface inventory system 100 in accordance with aspects of the subject matter disclosed herein.

FIG. 1 illustrates an example of a user interface inventory system 100. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. The system 100 or portions thereof may comprise a portion of a production system. The system 100 or portions thereof may comprise a portion of a test system. System 100 or portions thereof may be provided as a stand-alone system or as a plug-in or add-in.

System 100 may include one or more of: a processor (such as processor 142), a memory 144, a user interface inventory database or catalog 106, a scenario collector 108 that can track the order of events that a user does to accomplish a task, a record and play back module 110 that can record events that a user does to accomplish a task and play back that order of events for testing, a user interface inventory uploader 112 that can upload new user interface elements and/or meta-data for existing user interface elements, a report generator 114 that can report on the quantified verifications, verification engine 116 that can verify and test the code, and a codebase 118, a collection of code that makes up the user interface elements and functionality supporting the user interface elements. Other components well known in the arts may also be included but are not here shown. It will be appreciated that one or more modules implementing the scenario collector 108, the record and play back module 110, the user interface inventory uploader 112, the report generator 114 and the verification engine 116 can be loaded into memory 144 to cause one or more processors such as processor 142 to perform the actions attributed to the components of system 100. System 100 may operate on a running (executing) application or operating system represented in FIG. 1 by application 122.

The user interface inventory database or catalog 106 can include information for each user interface element encountered in a running application 122. Information can be collected over time, over many running applications on many computers or computer systems to augment the information stored in the user interface inventory database or catalog 106. In accordance with some aspects of the subject matter disclosed herein, the user interface inventory database or catalog 106 can be keyed on a global identifier for each user interface element stored in the user interface inventory database or catalog 106. The global identifier for the user interface element can be identical across systems. More specifically, the global identifier in accordance with some aspects of the subject matter disclosed herein, is unique across the entire user interface system. Even elements such as buttons that are identically labeled, such as, for example, with the word "OK", are uniquely identified based on key heuristics such as window, className, control type, application, and automation ID. Some of these properties are provided by a programmatic access interface known as UI Automation (UI Automation is a Microsoft® computer accessibility technology). The information in the user interface inventory database or catalog 106 can include information associated with the state of the user interface element at any particular point in time, information associated with the state of the user interface element at a particular point in time within a scenario, a sequence of user interactions with a sequential progression of user interface elements, the user interface element global identifier, metadata for the user interface element, events associated with a change in user elements and so on.

The metadata for the user interface element can include information about the user interface element, information about the testing associated with the user interface element, and information collected by the scenario collector 108 concerning the recorded scenarios that include the user interface element. The user interface inventory database or catalog 106 can also include scenario data that includes all the user interface elements (identified by the global user interface element identifier) touched by a user over time. The scenario data may also include time-stamped state information for the user interface elements, a sequence of user interactions with a sequential progression of user interface elements including the user interface element, associated accessibility events, system wide events and so on.

Information about the user interface element can include attributes of the user interface element, a description of the attribute, a value or list or range of values for the attribute, a required/not required indicator, identification of who maintains the attribute (e.g., user, tool, or both), and a priority rating. Each user interface element can be linked to verifications to enable the ability to solve the core problem of quantifying which and how many user interface elements were tested.

Attributes include but are not limited to the following:
priority (e.g., for accessibility, localization or XDR): how important the user interface element is compared to other user interface elements
query string: an identification of the user interface element in the software
link to parent record: link to the parent element containing the current user interface element
time stamp uploaded: when the user interface element was uploaded
time stamp modified: when the user interface element was last modified
last modified by: who last modified the user interface element
source: how the element was uploaded
class name: the clad that the user interface element is created from
link to framework: a specific link to the framework that created the control
process name: the process that the user element belongs to
module: the module that the user interface element belongs to
string resource location: location where string resources are held
comp central path: the location that identified the owner of the user interface element
SKU: the stock keeping unit identifier
Image: the image of the element (can be used for visual analysis and playback, for example).

Additional attributes include but are not limited to the following:
Architecture: e.g., 32 bit architecture or 64 bit architecture
syseParse: detailed system information
language: the language of the machine
screen shot: a link to a screenshot of the user interface element surface
log file: a link to a log file that created the entry
scenario attributes: a way to view the scenario attributes to the user interface element (may be one:many relationship)
MSAA properties: all of the user interface automation data for the user interface element
UIA properties: all of the user interface automation for the user interface element
Bounding rectangle: the four coordinates that define the location of the user interface element on the user interface surface
User interface surface: an attribute to distinguish if the user interface element is the top level element
Active: describes whether the user interface element is a shipping element
Private: describes whether the user interface element is private and not to be seen by users with read privileges.

Any verification that applies to any user interface element can be present in the user interface inventory catalog. Verification attributes can be determined by various tools and user interface elements uploaded by other tools. Hence, element-specific fields can be needed for SKU and architecture. Verification attributes can include but are not limited to:
name: name of the verification
result: the state of the verification (e.g., pass, fail, suppressed or blocked)
bug id: bugs associated with the verification
official/unofficial: whether this verification is used to report the official status of the feature
source: where the result of the verification came from (e.g., from the lab, manual, tool, scenario)
SKU: SKU of the machine that ran the verification
Architecture: e.g., 32/64 bit of the machine that ran the verification
Other: build, lab, etc.
Desktop Theme: the current theme running on the users desktop
Screen Resolution: the currently running screen resolution
DPI: the Dots Per Inch of the desktop
SyseParse: determine which are required.

Additional verification attributes can include but are not limited to:
Language: the language of the machine that ran the verification
Screen shot: a screen shot of what and/or where the verification tool place
Log file: additional information about the verification results
Test Group: a general grouping of tests (e.g., accessibility, localization, XDR, etc.)
Test: an individual test that is a subset of those test groups
Priority: priority of the individual test
Link: a link to get more information about the test
Milestone: the current milestone that the verification ran
Tenet: the tenet that is fulfilled by this verification
Exit criteria name: the exit criteria that is fulfilled by this verification
Exit criteria description: a description of each exit criteria Exit criteria priority: a priority of each exit criteria
Status: a note section to provide the ability for a tester to add information like open bugs, etc. that help explain the status of the scenario
Last modified by: who last modified the user interface element.

Each user interface element can also be linked to one or more scenarios. For each scenario that applies to a user interface element, the following attributes can exist in the user interface inventory database or catalog 106:
pillar scenario: the scenarios defined by tenets (e.g., navigable by keyboard, eventing is correct)
feature scenario: the scenario defined by a feature team
element: links to the user interface elements involved in the scenario
element timestamp: a timestamp of when the event occurred in the scenario
event: the type of event that occurred
event information: the event information for each event
event timestamp: a timestamp of when the event occurred in the scenario
Event information: this is the data associated with the event (e.g., MouseButtonDown has what button was down on the mouse)
HWND: the runtime handle the window
Element ID: the unique identifier of the UI Element.

A scenario collector 108 can be used to collect scenario data on a running (executing) application or operating system such as application 122. The scenario collector 108 can run in the background, can collect information associated with the user interface element in response to activation of the user interface element and can store the collected scenario data in a log file 120. An uploading module or uploader 112 can read the log file 120 and store information from the log file 120 in the user interface inventory database or catalog 106. A verification engine 116, etc. can process the data stored in the user interface inventory database or catalog 106 to extract and aggregate information from the user interface inventory database or catalog 106. A report generator 114 can receive processed data from the verification engine 116 stored in the user interface inventory database or catalog 106 and can produce reports therefrom.

The report generator 114 can report on user interface testing results including but not limited to degree of user interface testing coverage (user interface coverage) and completeness. The report generator can report on items including but not limited to:
  How many user interface elements are contained in the subject codebase (e.g., Microsoft® Windows)?
  What testing requirements did each user interface element undergo?
  How do teams sign off on the user interface elements they own?
  How important is a user interface element relative to other user interface elements?
  What user interface elements are involved in a scenario?
  What scenarios use a particular user interface element?
  Using information in the user interface inventory database or catalog 106, paths through user interfaces can be tracked and analyzed. This data can be used to determine what other data is needed on one or more user interface elements so that more user interface data can be collected. Path analysis, such as but not limited to call path analysis or user UI (user interface) path analysis, can be performed using the data stored in the user interface inventory database or catalog 106. For example, if there are twelve different ways to get from user interface element 1 to user interface element 2, path analysis can be performed on the data in the user interface inventory database or catalog 106 to determine the x most common ways that users navigate from user interface element 1 to user interface element 2.

A record and play back module 110 may represent a tool that allows a user (e.g., a tester) to run through a series of user interface elements, stop and play the sequence of actions back. The record and play back module 110 can also use information stored in the user interface inventory database and catalog 106 and/or log file 120 to overlay collected scenario data with data from the user interface inventory database and catalog 106. The record and play back module 110 can be applied to testing by recording a sequence of actions and extrapolating the recorded scenario to multiple different computer system setups by overlaying collected information with information from the user interface inventory database or catalog 106. For example, the recording can use the user interface inventory database or catalog 106 and log file 120 and replay the recording, overlaying the original setup with a different language, a different screen resolution, a different visual style or theme and so on.

Figure 2:
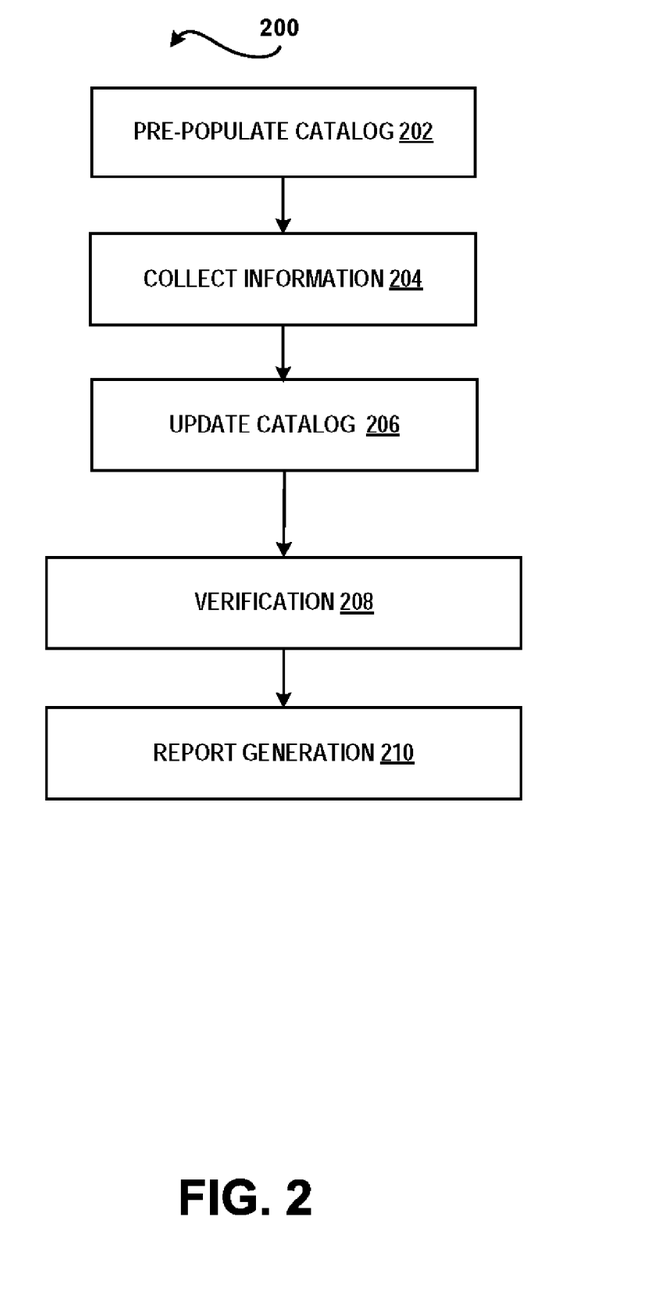
FIG. 2 is a flow diagram of an example of a method 200 for creating and using a user interface system in accordance with aspects of the subject matter disclosed herein.

FIG. 2 is an example of a method 200 for generating and using a user interface inventory system as described above with respect to FIG. 1 in accordance with aspects of the subject matter disclosed herein. It will be appreciated that some of the following actions may be optional or the actions described may be performed in sequences other than those depicted in FIG. 2. At 202 a user interface inventory database or catalog may be pre-populated using information such as the global user interface identifier. Activation of a user interface element can be recognized by detection of a focus change event or any other accessibility or system event that contains a window handle (HWND), including but not limited to mouse events or other input device events and so on. In accordance with some aspects of the subject matter disclosed herein, a user interface element may expose accessibility information from which a global identifier for the user interface element is derived. Alternatively, a global identifier for the user interface element may be derived by capturing a window for the user interface element and traversing a parent chain, collecting handles for each parent in the parent chain and the application in which a focus change event or other event occurred for the user interface element. The collected information can be collected in a history (e.g. log file). The user interface inventory database or catalog can be created initially as a series of global user interface element identifiers to which other pieces of associated information are subsequently added. The global user interface element identifier may be constant for the user interface element over any application, system or usage. The application data can be used to determine ownership of the user interface element.

After creation of the user interface inventory database or catalog, when an application is running, data can be collected at 204 by the scenario collector or other data-gathering tool. The generated global identifier for an activated user interface element can be used to determine if the activated user interface element is a new user interface element (will not be in the catalog) or is a known (cataloged) user interface element. Information can be collected in a production or test environment, on one or many systems, in one or many log files, over one or at many different time periods. Information can be collected by feedback tools including but not limited to a scenario feedback tool that collects user data from a user including but not limited to a remote customer such that the information is collected from a customer base and sent to one or more data collection centers. Information collected by a tool such as the scenario feedback collector and stored in a file such as a scenario log file can be used to update the user interface inventory database or catalog (e.g., by the uploader or uploading module) at 206. At 208 a verification module can process the information as described above.

Multiple verifications can be run on the data in the user interface inventory database or catalog including what information is missing for a user interface element, how many times the user interface was activated, how the user interface element was used, what events were generated, state changes for the user interface element and so on. Scenario data can be analyzed to detect which user interface elements are used most often to accomplish tasks, or which user interface elements are used most often to accomplish a particular task or tasks, enabling the system to increase the priority of user interface elements. At 210 various reports including but not limited to the reports described above can be generated. Such reports can include but are not limited to: a report on the most commonly used user interface elements, user interface elements that do not fire events or that fire particular events, user interface elements that are manipulated solely with a keyboard, a minimum and maximum time to perform a task, a number of times a particular user interface element appears in a scenario, percentage failure rate for a user interface element and so on.

It will be appreciated that the information gathered and analyzed as described above can be used to generate priority bug fix reports for software vendors.

Example of a Suitable Computing Environment

Figure 3:
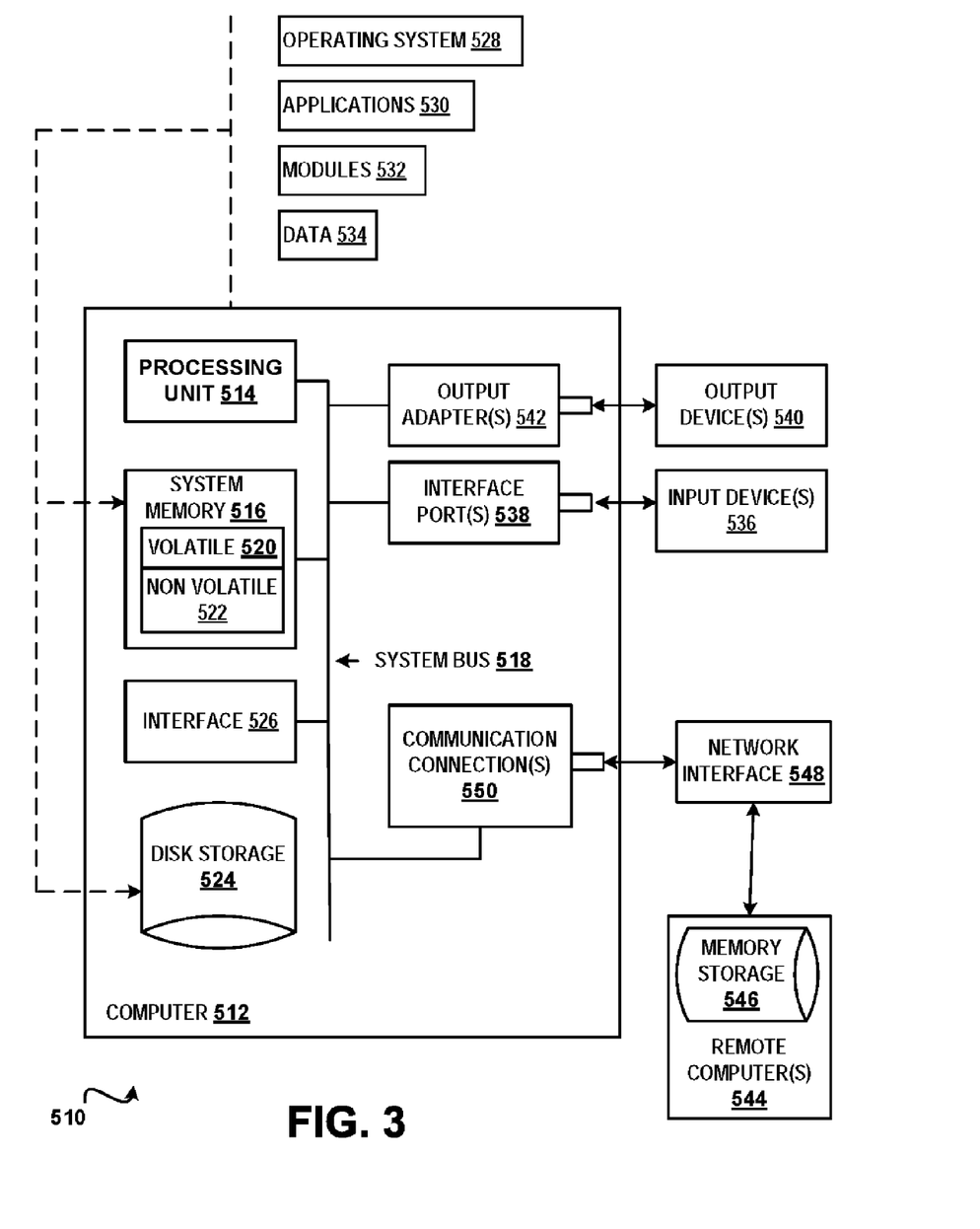
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
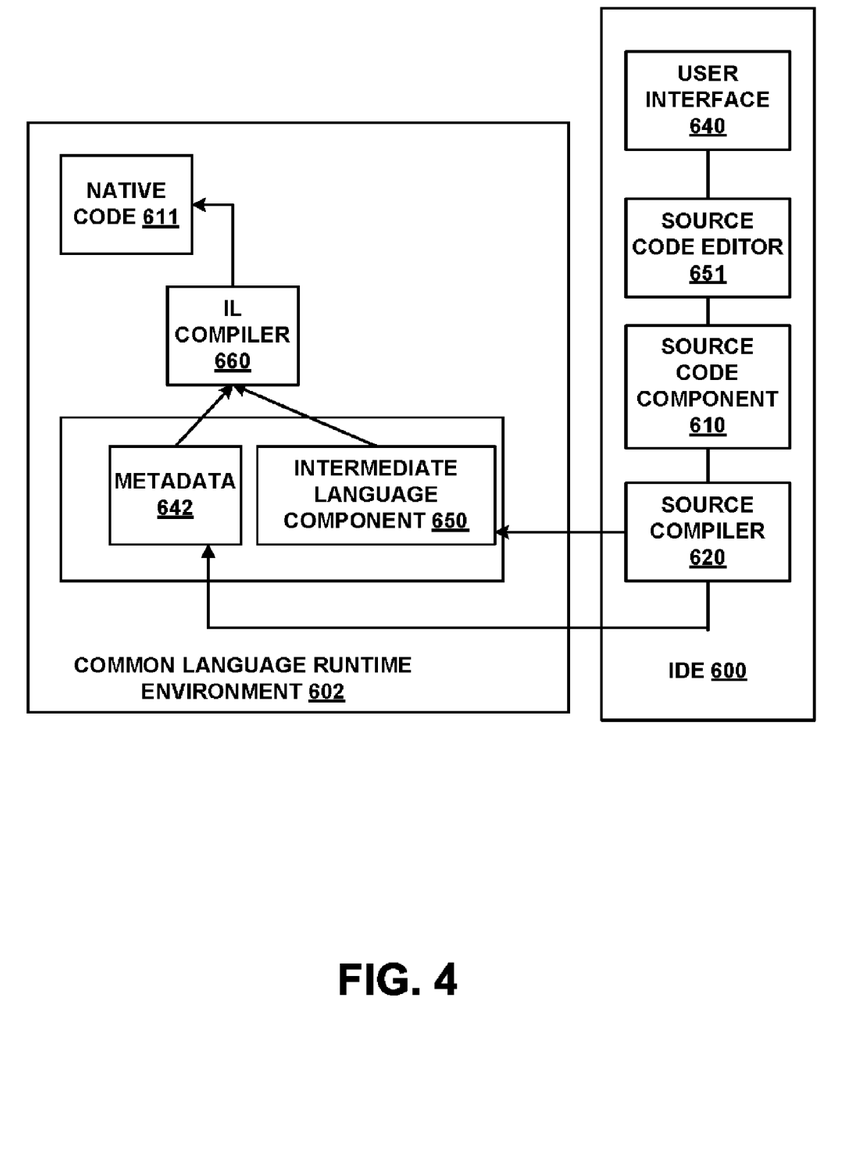
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development environment that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A method performed on a computing device, the method for tracking testing of user interface elements of a user interface system, the method comprising:
   receiving, from a plurality of different applications running on a plurality of different computing devices, information associated with the user interface elements, where each of the user interface elements is identified by a global identifier that is unique across all of the user interface elements of a user interface system;
   storing the received information in a user interface inventory database, where a portion of the stored information regarding the each of the user interface elements is keyed on its respective global identifier, where the information stored in the user interface inventory database for the each of the user interface elements comprises scenario data that includes:
   metadata for the each of the user interface elements,
   time-stamped state of the each of the user interface elements,
   events associated with a change in the each of the user interface elements, and
   a sequence of user interactions with a sequential progression of a variety of the user interface elements of the user interface; and
   analyzing the scenario data, where the analyzing results in determining a measure of usage of the each of the user interface elements, a measure of testing thoroughness of the each of the user interface elements, and a measure of how often the each of the user interface elements performs as expected.

2. The method of claim 1, wherein the scenario data further includes the global identifier of the each of the user interface elements.

3. The method of claim 1, further comprising overlaying the stored information with information from the user interface inventory database to extrapolate results of a recorded scenario comprising the each of the user interface elements to a plurality of different computer system setups.

4. The method of claim 1, further comprising generating reports on a degree of usage and testing of the each of the user interface elements.

5. The method of claim 1, further comprising recording a sequence of user interactions with the each of the user interface elements, and playing back the sequence of user interactions, overlaying the recorded sequence of user interactions with information from the user interface inventory catalog.

6. A computing device and at least one program module together configured for performing actions for tracking testing of user interface elements of a user interface system, the computing device comprising a memory that stores at least one of the at least one program module, the actions comprising:

receiving, from a plurality of different applications running on a plurality of different computing devices, information associated with the user interface elements, where each of the user interface elements is identified by a global identifier that is unique across all of the user interface elements of a user interface system;

storing the received information in a user interface inventory catalog, where a portion of the stored information regarding the each of the user interface elements is keyed on its respective global identifier, where the information stored in the user interface inventory catalog for the each of the user interface elements comprises scenario data that includes:

metadata for the each of the user interface elements, time-stamped state of the each of the user interface elements, events associated with a change in the each of the user interface elements, and a sequence of user interactions with a sequential progression of a variety of the user interface elements of the user interface; and analyzing the scenario data, where the analyzing results in determining a measure of usage of the each of the user interface elements, a measure of testing thoroughness of the each of the user interface elements, and a measure of how often the each of the user interface elements performs as expected.

7. The computing device and the at least one program module of claim 6, the actions further comprising updating the user interface inventory catalog with information collected from an executing application.

8. The computing device and the at least one program module of claim 6, the actions further comprising reporting on degree of testing of the each of the user interface elements identified by the global identifier and stored in the user interface inventory catalog.

9. The computing device and the at least one program module of claim 8, the actions further comprising reporting on usage of the each of the user interface elements identified by the global identifier and stored in the user interface inventory catalog.

10. The computing device and the at least one program module of claim 6, where the global identifier for the each of the user interface elements is derived from accessibility information returned in response to activation of the user interface element.

11. The computing device and the at least one program module of claim 6, the actions further comprising recording a series of user interactions and overlays recorded information with information stored in the user interface inventory database to extrapolate recorded results to a plurality of computer system setups.

12. At least one machine-readable memory storing computer-executable instructions that, when executed by a computing device, cause the computing device to perform actions for tracking testing of user interface elements of a user interface system, the actions comprising:

receiving, from a plurality of different applications running on a plurality of different computing devices, information associated with the user interface elements, where each of the user interface elements is identified by a global identifier that is unique across all of the user interface elements of a user interface system;

storing the received information in a user interface inventory catalog, where a portion of the stored information regarding the each of the user interface elements is keyed on its respective global identifier, where the information stored in the user interface inventory database for the each of the user interface elements comprises scenario data that comprises:

metadata and time-stamped state of the each of the user interface elements, events associated with a change in the each of the user interface elements, and a sequence of user interactions with a sequential progression of a variety of the user interface elements; and analyzing the scenario data, where the analyzing results in determining a measure of usage of the each of the user interface elements, a measure of testing thoroughness of the each of the user interface elements, and a measure of how often the each of the user interface elements performs as expected.

13. The at least one machine-readable memory of claim 12, the actions further comprising generating reports on usage of the each of the user interface elements based on the information stored in the user interface inventory database.

14. The at least one machine-readable memory of claim 12, the actions further comprising quantifying a degree of testing of the each of the user interface elements.

15. The at least one machine-readable memory of claim 12, the actions further comprising extrapolating results of a recorded scenario comprising the each of the user interface elements by overlaying the stored information with information from the user interface inventory database and replaying the scenario.

* * * * *